INVENTORS
JOHN L. CURTIN
DONALD M. YENNI

BY Barnwell R. King
ATTORNEY

INVENTORS
JOHN L. CURTIN
DONALD M. YENNI

BY Barnwell R. King
ATTORNEY

United States Patent Office 2,745,934
Patented May 15, 1956

2,745,934
INERT GAS SHIELDED MAGNETIC FIELD CONTROLLED ELECTRIC ARC METAL WORKING APPARATUS

John L. Curtin, Kenmore, and Donald M. Yenni, Williamsville, N. Y., assignors, by mesne assignments, to Union Carbide and Carbon Corporation, a corporation of New York Original application October 27, 1950, Serial No. 192,482, now Patent No. 2,666,122, dated January 12, 1954. Divided and this application April 30, 1953, Serial No. 352,152.

8 Claims. (Cl. 219—8)

This invention relates to metal working with an electric arc energized by current flowing through a circuit which includes the work and an electrode, and more particularly such metal working in which the electrode and the work are protected from oxidation by a stream of monatomic gas flowing around the arc.

This application is a division of our application Serial No. 192,482, filed October 27, 1950.

In gas shielded arc welding it has been generally found possible to weld stainless steel at higher speeds by shielding the arc with helium without producing undercutting than has been the case with argon. However, there is a distinctly greater tendency toward weld porosity with helium unless extremely pure helium is used. Prior to the invention it was possible to produce smooth butt welds showing good penetration on eighteen-gauge sheet at speeds up to fifty inches per minute in helium, while argon welds made at such speed showed serious undercutting.

In an attempt to overcome such difficulties, a trial using an electromagnet consisting of a current carrying solenoid surrounding the welding electrode did not yield improved surface, or increase welding speed.

Prior to the present invention it was also proposed to use a gas cup comprising an annular soft iron pole piece, a ring magnet, an aluminum ferrule, and a plastic connector. The ring magnet created a magnetic field similar to that produced by the solenoid located parallel and coaxial with the electrode. Measured at the electrode tip, the vertical component of the magnetic field was 160 gausses, the horizontal component was negligible. The field associated with the cup did not exert directional control of the arc, but changed the shape and potential gradient in the arc. Weld bead tests showed that no improvement in surface quality or welding speed was obtained with such cup on thin stainless steel.

It also has been proposed to use a relatively large magnet having pole pieces located on opposite sides of the gas cup, but the induced magnetic field from the arc current caused demagnetization of the permanent magnet by opposing its natural field. Furthermore, it was difficult to use such device between clamps and in other confined spaces. Also results were erratic and unpredictable.

The main object of this invention, therefore, is to provide an improved means for working metal with an arc shielded from the atmosphere in a stream of monatomic gas, especially argon. Another important object is to increase the speed of welding metal including stainless steel. A further object is to provide an improved gas cup or nozzle for this purpose. Additional objects are to reduce the cost, increase the usefulness, and advance the art of monatomic gas shielded arc welding and cutting. Other objects will appear from the following description.

Broadly, according to the invention, there is provided a process of working metal which comprises establishing a metal fusing electric arc between the work and either a fusible or a refractory-metal electrode by flowing current through such electrode and the work. A stream of inert gas is discharged from a cup surrounding the electrode so that such gas flows around such electrode and arc, and over the adjacent work metal. The arc is directed with the transverse component of an auxiliary magnetic field derived from a source of flux, such as a permanent magnet, incorporated in or with the nozzle of such cup so that the curvature of the magnet substantially coincides with that of the cup; and such work and the electrode are relatively moved along the line to be worked, thereby progressively fusing the work metal along such line. The strength of said field is such, with respect to the current flowing in the arc, that the arc is kept focussed on the work along such line at a substantially constant acute angle of "lead" or "lag," whereby the speed of such relative movement is substantially increased over the prior art without adversely affecting the quality of the resulting product. Such angle of "lead" or "lag" is the angle between a line tangent to the arc (the tangent at the midpoint for a curved arc) and the center line of the electrode lying in a plane containing the electrode and the path of movement of the electrode with respect to the work.

A remarkable increase is attained in the maximum speed of welding thin stainless steel with helium as well as with argon shielding by the use of such auxiliary magnetic field. The magnetic field, for example, increases the maximum welding speed of 0.050-inch thick stainless steel with D. C. straight polarity (electrode negative) from 30 to 130 inches per minute with argon shielding, and from 50 to 190 inches per minute with helium shielding.

One of the most noticeable results of the magnetic field of the invention is its influence on arc position. Optimum welding results and thermal efficiency in butt welding are produced with the auxiliary magnetic field when the arc is focussed forwardly in the direction of weld travel at a "lead" angle of about 45 degrees to the work, without any lateral deviation to right or left of the welding line.

A marked increase in the speed of arc cutting metal sheet, and cuts of improved quality are also secured by the invention.

Figure 2A:
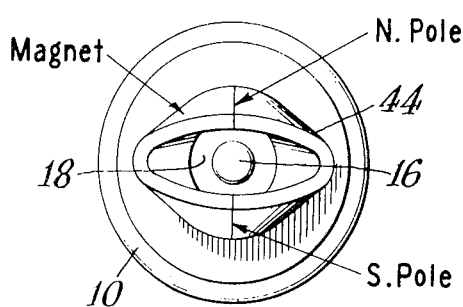
Fig. 2a is a similar view of a modification (oval cup)
Figure 2:
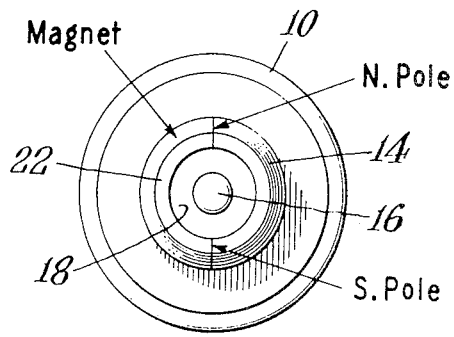
Fig. 2 is a bottom plan view of the torch shown in Fig. 1.
Figure 3:
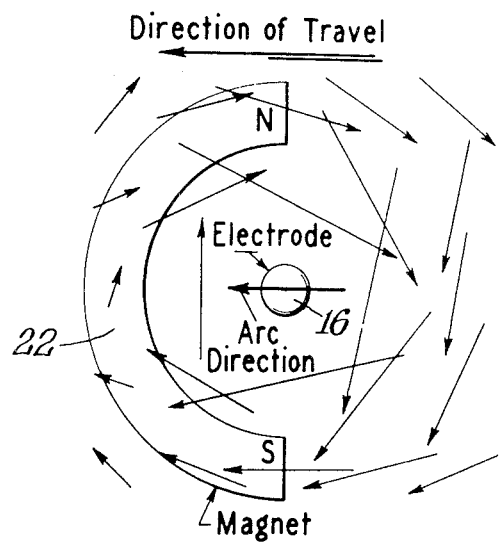
Figures 4, 6:
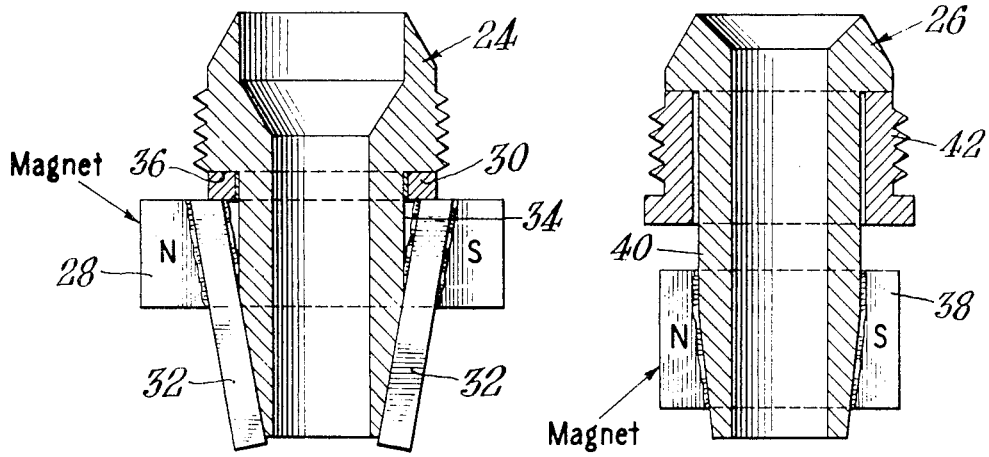
Figures 5, 7:
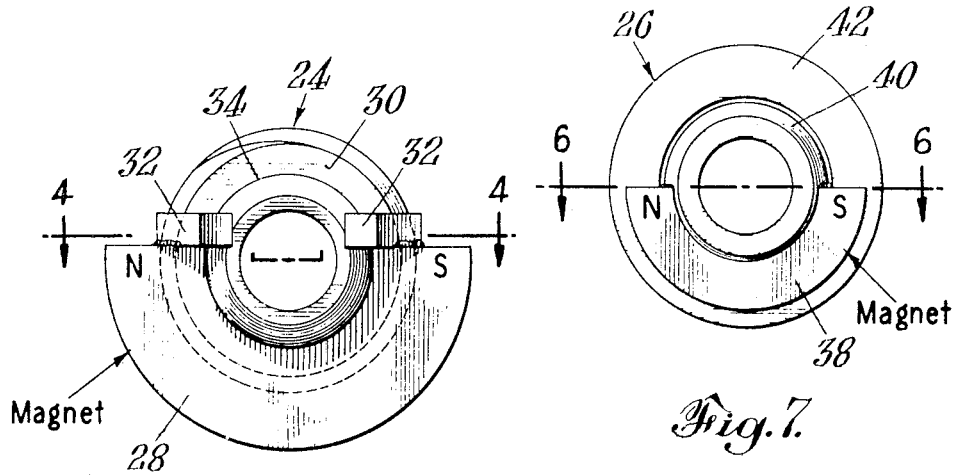

Fig. 3 is an enlarged diagram illustrating the flux field of Fig. 2 using D. C.-S. P. and looking upwardly from the bottom of the torch;

Fig. 4 is a vertical cross-sectional view of a cup modification in which the magnet is adjustable;

Fig. 5 is a bottom plan view of the cup shown in Fig. 4;

Fig. 6 is another modification of the cup; and

Fig. 7 is a bottom plan view of the latter.

Figure 1:
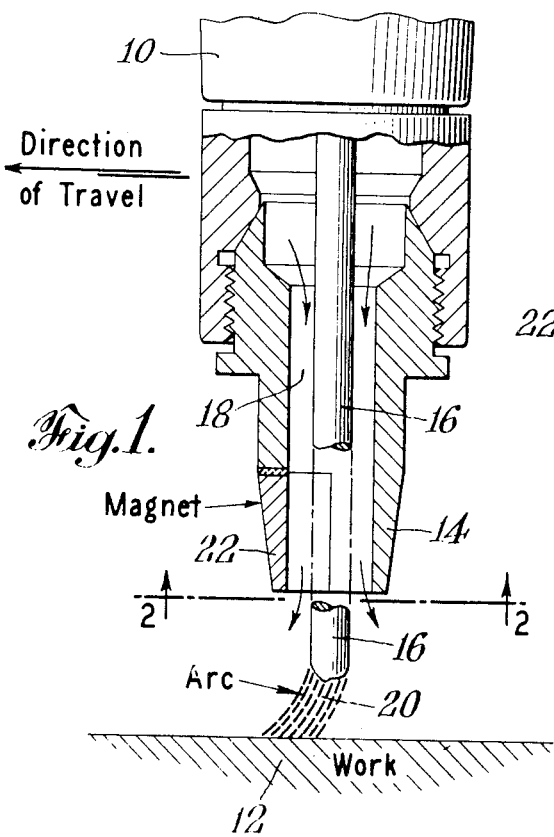
Fig. 1 is a view mainly in side elevation of a machine welding set-up illustrating the invention, parts of the apparatus being broken away and shown in section.

As shown in Figs. 1 and 2, a machine welding torch 10 is mounted above work 12 for movement along a line to be welded. The torch comprises a gas cup or nozzle 14 of novel construction surrounding a refractory metal (tungsten) electrode 16. The electrode is, of course, composed of fusible metal for metal-arc welding. The interior of the cup is radially spaced from the electrode to provide an annular passage 18 through which a stream of inert gas is discharged, protecting the heated parts of the electrode and work, as well as the arc 20, from the atmosphere. The work and the electrode are connected in a conventional arc-welding current supply circuit (not shown), which is well known to those skilled in the art.

The body of the cup 14 is first made of suitable material such as drawn copper and a semi-circular end portion thereof is removed. This provides a suitable recess for securing a similarly shaped permanent horseshoe magnet 22 composed of a magnetized high-permeability alloy, which is silver-soldered in place to the body of the cup so that the axis of curvature of the magnet substantially coincides with that of the cup. A novel magnetic gas cup results which is interchangeable with conventional gas cups. The cup is preferably mounted on the torch 10 so that the magnet 22 is in a leading position with respect to the direction of travel of the torch during the welding of the work 12. This avoids demagnetization by the induced field from the arc current, permits use of a somewhat smaller magnet, and facilitates arc adjustment during operation. The leading magnet position causes the field induced by the arc current to strengthen the field from the permanent magnet, instead of opposing it for D. C.-S. P. welding.

When magnetic cups of the type shown (Fig. 1) are used, adjustment of arc deviation from the line of travel can only be achieved by rotating the entire torch. As shown in Figs. 4-7, however, cups 24 and 26 are constructed to facilitate adjustment of the arc deviation or angular position independently of the torch position. One (Figs. 4 and 5), comprises a relatively large, removable semi-cylindrical magnet 28 held in place by magnetic attraction to a soft iron ring 30 fastened near the top of the gas cup 24 (composed of copper) and creating the desired field at the arc position with downwardly and inwardly inclined steel pole pieces 32, 32, which are welded (silver-soldered) to the poles of such magnet. The ring 30 likewise is welded to the cup at the junction of the nozzle 34 with the shoulder 36. While such construction locates the magnet away from the heated zone (thereby increasing its life), and permits instant rotary adjustment or removal of the magnet unit if desired, the magnetic field is more easily influenced by surrounding magnetic objects than that from the small magnet built in the gas cup, as shown in Fig. 1.

The other modification, Figs. 6 and 7, comprises a small semi-cylindrical horseshoe magnet 38 welded (silver-soldered) to the nozzle 40 near the cup tip, and makes use of a seat and retaining nut 42 to permit rotary adjustment of the entire cup 26 including the magnet in the torch. Hand tightness of the retaining nut 42 is sufficient to prevent argon or helium gas leaks and to secure satisfactory heat transfer with well-machined parts.

The influence of the magnetic field on the arc can be predicted from the familiar electrical engineering "motor rule" relating the directions of magnetic field, arc current and force acting on the arc. The arc deflection agrees with the prediction based on measurements of the field resulting from the auxiliary magnet, and the self-induced field from the welding current. This field is a vector sum of the individual fields modified by external magnetic influences such as iron clamps or rollers (which are likely to have little effect if a magnet sufficiently close to the welding zone is used). The important component of the magnetic field is that projected on a plane parallel with the workpiece, i. e., horizontal in normal welding. The other components have little significance and wide variations in them have little effect on the arc direction.

A plot of the resultant magnetic field associated with butt welding 16 gauge stainless steel at 60 inches per minute with 290 amperes, is shown in Fig. 3. The field induced by the welding current has the shape of concentric circles surrounding the arc. Direction of the resultant magnetic flux lines is indicated and the length of the arrow is proportional to the horizontal component of the field intensity in that plane. Actual measurements of the magnetic field from the auxiliary magnet were plotted and superpositioned on the field from the current to obtain a resultant field showing fairly good agreement with the measured resultant field. By utilizing the motor rule or the cross product of the current and field vectors, the final position of the arc can be approximated.

A study was made of the effect of magnetically-deflected arcs in argon on the quantity of heat received by stainless steel workpieces and on the geometry of the resulting weld bead cross-sections as a function of the angle of inclination of the arc. The auxiliary magnetic field intensity at the electrode tip (produced by a small symmetrically-positioned horseshoe magnet) was varied from 5 to 110 gausses by changing the vertical distance between the plane of the magnet and the work surface. It was thus possible to secure calorimetric and weld bead contour measurements at arc deflections ranging from a positive angle of approximately 85 degrees arc "lead" to a negative angle of approximately 90 degrees arc "lag" using 200 amperes D. C.-S. P., arc current. The indicated angles of inclination were those observed in the plane containing the electrode axis and the center line of the weld bead. As viewed in the direction of travel the arc was maintained along the electrode axis normal to the work surface. The welding torch was held fixed while the work passed beneath the 3/32-inch diameter electrode at a speed of about 114 inches per minute, using an argon flow rate of 7.1 liters per minute.

The data presented below summarize the results of measurements obtained at seven different arc angles including that characteristic of normal behavior without magnetic control. It is apparent that the amount of heat received by the work and the arc efficiency factors reached a maximum when a suitable magnetic field was used to effect a leading angle of about 45 degrees between arc and work.

| Arc Inclination | Horizontal Field, Gausses | Arc Voltage | Arc Power, Watts | Power to Work, Watts | Heat Transfer Eff., Percent | Melted Metal Area, Sq. In. | Melted Metal, Cu. In./Kwh. | Bead Depth, Inches | Bead Width, Inches |
|---|---|---|---|---|---|---|---|---|---|
| 90° Lag | 65 | 13.9 | 2,780 | 1,640 | 59 | 0.0007 | 1.7 | 0.011 | 0.08 |
| 30° Lag | 25 | 13.1 | 2,620 | 1,860 | 71 | 0.0008 | 2.1 | 0.011 | 0.09 |
| 5° Lag | None | 12.8 | 2,560 | 1,980 | 77 | 0.0012 | 3.2 | 0.020 | 0.11 |
| 5° Lead | 5 | 12.5 | 2,500 | 2,020 | 81 | 0.0014 | 3.8 | 0.021 | 0.12 |
| 35° Lead | 35 | 12.6 | 2,520 | 2,000 | 79 | 0.0016 | 4.3 | 0.021 | 0.12 |
| 55° Lead | 70 | 12.9 | 2,580 | 2,110 | 82 | 0.0017 | 4.5 | 0.021 | 0.11 |
| 85° Lead | 110 | 12.6 | 2,520 | 1,860 | 74 | 0.0013 | 3.5 | 0.021 | 0.11 |

Most of the welding tests were made as beads rather than butt joints to avoid difficulties associated with irregularities in spacing and clamping. It has been shown in the past that results obtained in this manner are indicative of performance on actual welds on thin materials. Furthermore, actual butt welds were made as a final check.

A remarkable improvement in welding speed was attained on 0.050 inch thick stainless steel sheet by the invention. Results are summarized in the data tabulated below, and show that an increase in maximum speed by a factor of about four was attained with helium shielding, as well as with argon shielding. Comparable results for equal arc power and equal arc current are also indicated in the table. In this work, a 1/16-inch diameter tungsten electrode was used for 90 to 110 amperes, a 1/8-inch electrode for 340 amperes, and a 3/16-inch electrode for 460 amperes D. C.-S. P. All welds were completely penetrated and displayed acceptably small undercut, low center and high crown not exceeding 0.003 inch.

| Shielding Gas | Auxiliary Magnetic Field Gausses [1] | Welding Speed, I. P. M. | Arc Current, Amp. | Arc Power, Watts | Remarks |
|---|---|---|---|---|---|
| Argon | Not used | 30 | 90 | 990 | Limited by undercut. |
| Helium | do | 50 | 110 | 1,760 | Limited by low center. |
| Argon | 100 | 130 | 425← | 5,050← | Do. |
| Helium | 100 | 190 | 460 | 6,900 | Limited by sensitivity of arc. |
| Do | 100 | 150 | 340 | 5,050← | Equal power. |
| Do | 100 | 170 | 425← | 6,300 | Equal current. |

[1] Horizontal component of auxiliary magnetic field as measured at the electrode tip.

A second series of welds were made on 5/32-inch thick stainless steel. The results of such work, summarized below, show that the use of an auxiliary magnetic field caused a 50 to 60 percent increase in maximum speed, and that the maximum speed with helium shielding exceeded that obtained with argon shielding by about 30 percent.

| Shielding Gas | Welding Speed, I. P. M. | Arc Current, Amps. | Normal Welding | | Magnetic Field Welding [2] | |
|---|---|---|---|---|---|---|
| | | | Undercut, Inches | Crown, Inches | Undercut, Inches | Crown, Inches |
| Argon [1] | 20 | 360 | 0.004 | 0.000 | 0.001 | 0.006 |
| Argon | 30 | 470 | 0.020 | 0.024 | 0.005 | 0.005 |
| Helium [1] | 25 | 320 | 0.004 | 0.005 | 0.005 | 0.004 |
| Helium | 40 | 480 | 0.004 | 0.011 | 0.002 | 0.006 |

[1] Shielding gas flow rates were 7 liters per minute for argon and 14 liters per minute for helium.
[2] Horizontal component of magnetic field at the electrode tip was 20-30 gausses.

The magnetic field intensity required for welding 0.050 inch thick stainless steel is considerably stronger than that used on the 5/32-inch steel, being 100 and 20 gausses at the electrode tip, respectively. The lower welding speed used on the 5/32-inch material may be at least partially responsible for the reduction required in the auxiliary magnetic field strength.

Fortunately, the attainment of marked improvement in welding speed does not require precise adjustment of magnetic field strength or orientation. It was found that fields varying in strength of the horizontal component at the electrode tip between 60 to 100 gausses were almost equally effective on 0.050 inch thick stainless steel. Nevertheless, it is apparent that changes must be made in magnetic strength to achieve satisfactory results at widely varying welding speeds on materials of various thicknesses. While sufficient data were not obtained to permit tabulation of the most desirable magnetic field for different welding conditions, it is felt that two or three cups with horizontal components of field strength varying from 20 to 100 gausses at the electrode tip should take care of most down-hand welding requirements on stainless steel.

The effectiveness of magnetic arc control in increasing the maximum acceptable welding speed with argon shielding suggested its use in improving cutting performance; the cutting action being secured by rotating the auxiliary magnet approximately 180 degrees from the position employed in welding. A number of tests showed that a definite improvement in cutting performance and increased cutting speed could be attained on 1/16-inch material with an auxiliary field of roughly 60 gausses producing one smooth edge and one rough edge. The smooth edge can be predetermined. Typical results are shown below:

| Cutting Speed, I. P. M. | Arc Current, Amp. | Electrode Diameter, Inches | Cut Width, Inches |
|---|---|---|---|
| 20 | 150 | 1/4 | 3/16-1/4 |
| 60 | 490 | 3/16 | 1/4 |
| 70 | 490 | 3/16 | 1/4 |
| 100 | 490 | 3/16 | 3/16 |

The influence of auxiliary magnetic fields was also studied briefly on copper, Everdur, and steel. The results indicated that the invention increased the speed and reduced undercut in welding such metals with both helium and argon as the shielding gas.

It has also been found that a field such as has been described improves the performance of inert gas shielded arc welding using a consumable metal electrode. For example, direct current-reverse polarity welding of mild steel with an argon shielded, steel electrode increased the bead width and decreased undesirably sharp intersections of the bead with the base metal. In such case the polarity of the magnet was reversed compared to straight polarity welding.

While round cups have been shown, an oval cup 44, Fig. 2, may be used without departing from the invention. In some cases oval cups are even preferred, because they have the added advantages of good gas shielding and the cup is not damaged by the lagging or leading arc.

We claim:

1. A gas cup for inert gas shielded electric arc-metal working torches, consisting of a gas nozzle having incorporated therewith a horseshoe magnet the curvature of which substantially coincides with that of the nozzle.

2. A gas cup for inert gas shielded electric arc-metal working torches, consisting of a gas nozzle having incorporated therewith a semi-circular permanent magnet the longitudinal axis of curvature of which substantially coincides with that of the nozzle.

3. A gas cup for an inert gas shielded electric arc-metal working torch, consisting of a gas nozzle having a recess in the gas outlet portion thereof, and a permanent magnet mounted in such recess, said magnet having a curvature substantially similar to that of the nozzle.

4. A gas cup for an inert gas shielded electric arc-metal working torch, consisting of a gas nozzle having a semi-cylindrical recess in the gas outlet portion thereof, and a semi-cylindrical permanent magnet mounted in such recess.

5. A gas cup for an inert gas shielded electric arc-metal working torch, consisting of a gas nozzle joining a cylindrical shoulder, a ring composed of soft iron mounted at the juncture of said shoulder and nozzle, and a magnet-unit consisting of a permanent magnet fitting said nozzle adjacent said ring, said magnet having a curvature substantially similar to that of the nozzle and a pair of steel pole pieces mounted on the poles of said magnet and depending downwardly and inwardly toward the gas outlet end of said nozzle, said magnet-unit being held in place on the nozzle by the magnetic attraction of the soft iron ring, which however permits rotary adjustment of the magnet-unit on the nozzle, as well as quick removal of such unit therefrom.

6. A gas cup for an inert gas shielded electric arc-metal working torch, consisting of a gas nozzle joining a cylindrical shoulder, a ring composed of soft iron mounted at the juncture of said shoulder and nozzle, and a magnet-unit consisting of a semi-cylindrical permanent magnet fitting said nozzle adjacent said ring, and a pair of steel pole pieces mounted on the poles of said magnet and depending downwardly and inwardly toward the gas outlet end of said nozzle, said magnet-unit being held in place on the nozzle by the magnetic attraction of the soft iron ring, which however permits rotary adjustment of the magnet-unit on the nozzle, as well as quick removal of such unit therefrom.

7. A gas cup for an inert gas shielded electric arc-metal working torch, comprising a nozzle having an external annular shoulder, a hollow nut engaging said shoulder for securing the nozzle in place on a torch, and a permanent magnet mounted on said nozzle between said nut and the gas outlet end of the nozzle said magnet having a curvature substantially similar to that of the nozzle.

8. A gas cup for an inert gas shielded electric arc-metal working torch, comprising a nozzle having an external annular shoulder, a hollow nut engaging said shoulder for securing the nozzle in place on a torch, and a semi-cylindrical permanent magnet mounted on said nozzle between said nut and the gas outlet end of the nozzle.

References Cited in the file of this patent
UNITED STATES PATENTS

| | | |
|---|---|---|
| 1,740,381 | Weed | Dec. 17, 1929 |
| 2,475,183 | Gibson | July 5, 1949 |